(12) United States Patent
Wang et al.

(10) Patent No.: US 6,973,360 B1
(45) Date of Patent: Dec. 6, 2005

(54) PORTABLE COMPUTER SYSTEM WITH A ROTATABLE PLATE FOR PLAYING MULTIMEDIA DATA DIRECTLY

(75) Inventors: Beniz Wang, Taipei (TW); Miriam Cheng, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 10/922,962

(22) Filed: Aug. 23, 2004

(51) Int. Cl.[7] .............................................. G06F 19/00

(52) U.S. Cl. ........................ 700/100; 700/94; 455/566; 710/14

(58) Field of Search .......................... 700/94, 100, 168; 455/566, 426, 422.1, 550.1; 725/153, 134, 725/142; 713/300; 348/14.04, 14.07

(56) References Cited

U.S. PATENT DOCUMENTS

| | | | |
|---|---|---|---|
| 6,895,448 B2 * | 5/2005 | Chan et al. .................... 710/14 |
| 2004/0204015 A1 * | 10/2004 | Harmon et al. .......... 455/550.1 |
| 2004/0224638 A1 * | 11/2004 | Fadell et al. ............... 455/66.1 |
| 2005/0064911 A1 * | 3/2005 | Chen et al. ................. 455/566 |

* cited by examiner

*Primary Examiner*—Kidest Bahta
(74) *Attorney, Agent, or Firm*—Harness, Dickey & Pierce, PLC

(57) ABSTRACT

A portable computer system with a rotatable plate for playing multimedia data directly includes a rotatable plate pivotally arranged at one side of the portable computer and a multimedia-processing device arranged on the rotatable plate and on the mainframe corresponding to the rotatable plate. Users can manipulate the multimedia-processing device by opening the rotatable plate, and close the rotatable plate to protect the multimedia-processing device.

6 Claims, 6 Drawing Sheets

PORTABLE COMPUTER SYSTEM WITH A ROTATABLE PLATE FOR PLAYING MULTIMEDIA DATA DIRECTLY

BACKGROUND OF THE INVENTION

1. Field of Invention

The present invention relates to a portable computer system, and more particularly, to a portable computer system with a rotatable plate for playing multimedia data directly.

2. Related Art

Recently, Taiwan has been highly praised for the ability of researching and manufacturing semiconductors and electronic products.

Portable electronic devices, such as mobile phones, notebooks, and personal digital assistants, have been highly developed for their portability and small volume, despite their weakness in upgrading functions compared to desktops.

The development of the note book is especially important, and many ideas have been proposed, such as the combination of a note book with a multimedia-processing device or a note book with a built-in digital camera.

The note book can only play multimedia data after initializing the peripherals and executing relative programs, which is quite complicated and inconvenient.

To solve the problem as mentioned above, a note book with control keys and a display device for displaying multimedia data disposed on the top or at a side of the case is proposed, and therefore displaying multimedia data may be facilitated.

However, since the note book must be turned on and some preset hot keys must be pressed before executing the multimedia-processing device, it is still inconvenient to users.

In FIG. 1, a multimedia-processing device having a display monitor 10, control keys 20, and an audio output 30 is exposed outside the note book case to facilitate user's controlling. However, the exposed display monitor 10, control keys 20, and the audio output 30 are liable to be touched by accident or damage due to exterior forces.

The problems of the related art as mentioned above should be deviated as soon as possible.

SUMMARY OF THE INVENTION

Accordingly, the object of the present invention is to provide a portable computer system with a rotatable plate for playing multimedia data directly, which arranges a rotatable plate on the monitor and disposes a multimedia-processing device on the rotatable plate and on the mainframe corresponding to the rotatable plate. Users can manipulate the multimedia-processing device by opening the rotatable plate, and close the rotatable plate to protect the multimedia-processing device.

The power supply of the multimedia-processing device is independent of the one of the portable computer, and therefore users can use the multimedia-processing device directly without actuating the portable computer.

The portable computer system of the present invention, for playing multimedia data directly, includes a mainframe, a first display device, and a multimedia-processing device.

The mainframe is for processing electrical data, the first display device rotatably arranged at one side of the mainframe is for displaying the processing result of the electrical data, and the multimedia-processing device includes a second display device, an audio output, and a plurality of control keys.

A rotatable plate is rotatably disposed at one side of the first display device. The second display device and the audio output are both disposed on the rotatable plate for displaying information about playing multimedia data and outputting audio signals respectively. The control keys are arranged on the mainframe corresponding to the rotatable plate for executing different functions.

Users can manipulate the multimedia-processing device by opening the rotatable plate to expose the second display device, the audio output, and the control keys. On the other hand, if users do not want to manipulate the multimedia-processing device, they can close the rotatable plate protect the multimedia-processing device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given in the illustration below only, and thus doesn't limit the present invention, wherein.

DETAILED DESCRIPTION OF THE INVENTION

Figure 1:
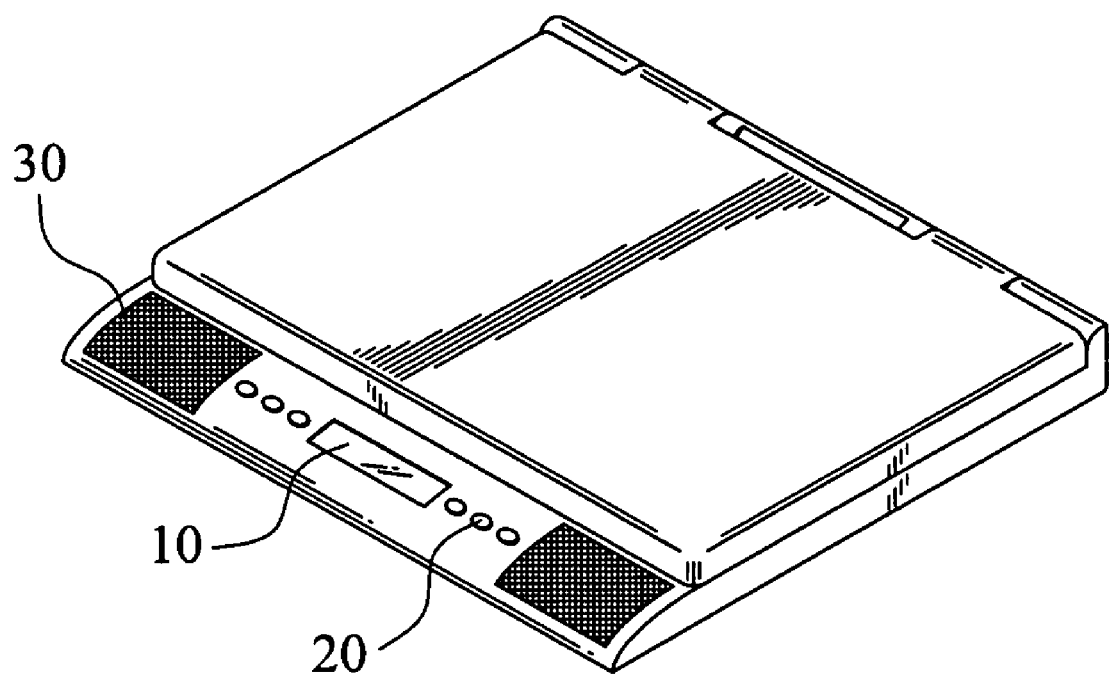
FIG. 1 illustrates a perspective view of a related art portable computer with a multimedia-processing device.
Figure 2A:
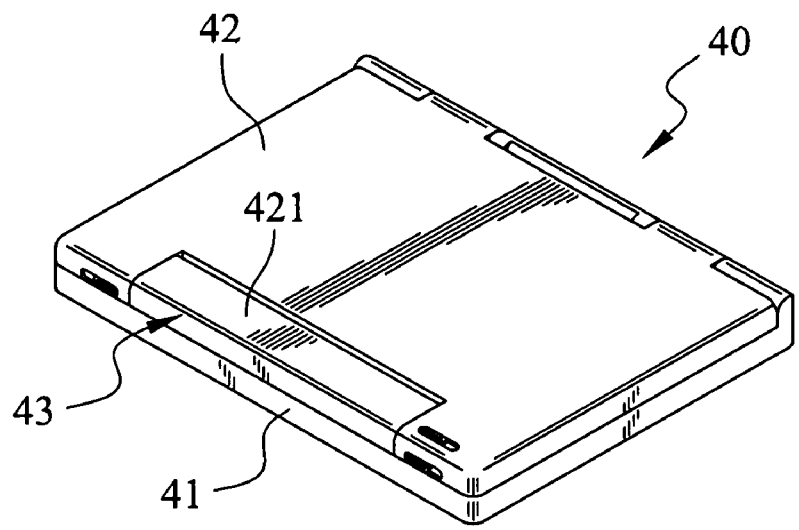
FIG. 2A illustrates a perspective view of a portable computer for playing multimedia data with a rotatable plate closed as a first embodiment of the present invention.
Figure 2B:
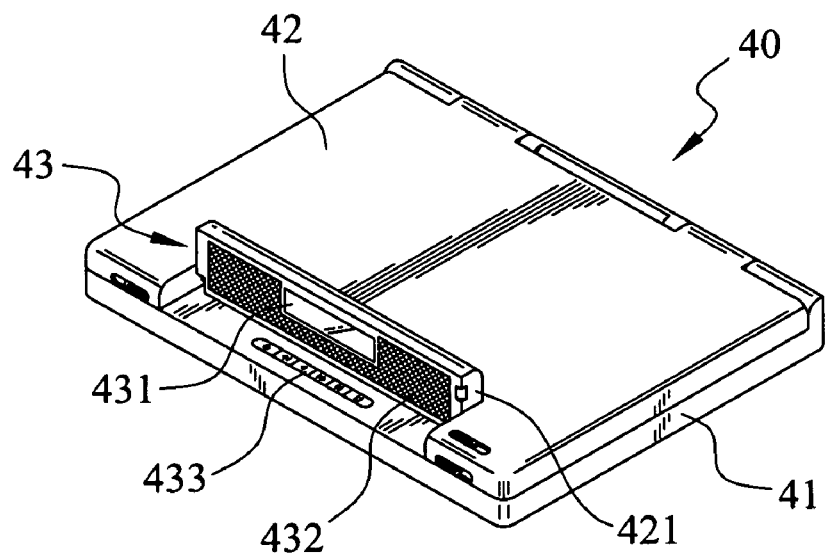
FIG. 2B illustrates a perspective view of a portable computer for playing multimedia data with a rotatable plate opened as a first embodiment of the present invention.

FIG. 2A illustrates a perspective view of a portable computer for playing with multimedia devices with a rotatable plate closed as a first embodiment of the present invention, and FIG. 2B illustrates a perspective view of a portable computer for playing with multimedia devices with a rotatable plate opened as a first embodiment of the present invention. The portable computer 40 includes a mainframe 41, a first display device 42, and a multimedia-processing device 43.

The mainframe 41 is the main component of the portable computer for processing electric data. For example, the mainframe 41 can edits documents or draws pictures by executing relative application programs or functions, and displays the results through the first display device 42, such as an LCD, connected to the mainframe 41.

The multimedia-processing device 43 is arranged at one side of the portable computer 40 for playing with multimedia devices, such as an mp3 or a CD player.

A rotatable plate 421 is rotatably arranged at one side of the first display device 42. As shown in FIG. 2A and FIG. 2B, the rotatable plate 421 can open or close relative to the mainframe 41. That is, when users want to use the multimedia-processing device 43, the rotatable plate 421 is opened. And when users do not want to use the multimedia-processing device 43, the rotatable plate 421 is closed. Since the rotatable plate 421 covers the mainframe 41 when closed, the multimedia-processing device 43 is protected from damage.

The multimedia-processing device 43 includes a second display device 431, an audio output 432, and a plurality of control keys. The second display device 431 is arranged on the rotatable plate 421 for displaying the information of the multimedia data, such as the name of the song that is playing and how long the song has been played. The second display device 431 is usually an LCD.

The audio output 432 is also arranged on the rotatable plate 421 and surrounds the second display device 431 for outputting audio signals of the multimedia data.

The plurality of the control keys is arranged on the mainframe 41 corresponding to the rotatable plate 421 as an interface for users to input desired functions, such as 'play', 'pause', 'stop', and so on.

Since the power supply of the multimedia-processing device 43 is independent of the one of the portable computer 40, users can directly use the multimedia-processing device 43 by opening the rotatable plate 421, to expose the second display device 431, the audio output 432, and the control keys without turning on the portable computer 40.

Two kinds of combination of the rotatable plate 421 with the first display device will be described in detail. It is worth noting that any other combinations without departing the scope of the invention can be made in the present invention.

Figure 3:
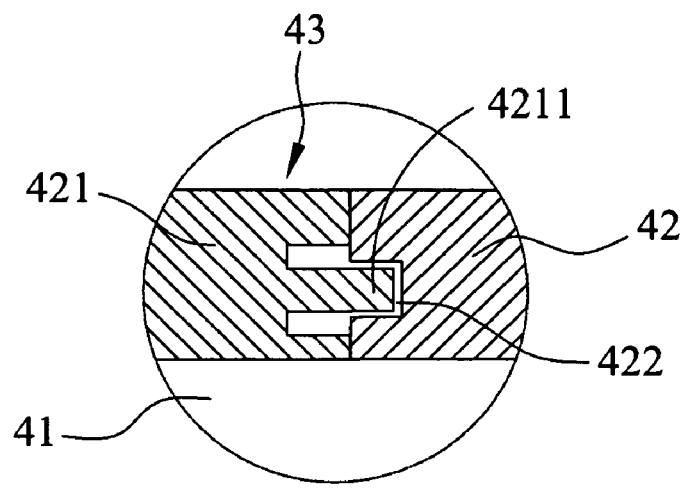
FIG. 3 shows the first way of combining the rotatable plate 421 with the first display device 42.

FIG. 3 shows the first way of combining the rotatable plate 421 with the first display device 42. Two rotating axles 4211 arranged respectively on two sides of the rotatable plate 421 are pivotally connected to the first display device. The first display device 42 has a trench corresponding to each of the rotating axles 4211. The rotating axles 4211 are rotatably inserted into the trenches 422 when combining the rotatable plate 421 with the first display device 42, and thereby users can open or close the multimedia-processing device 43 by exerting forces to the rotatable plate 421.

Figure 4:
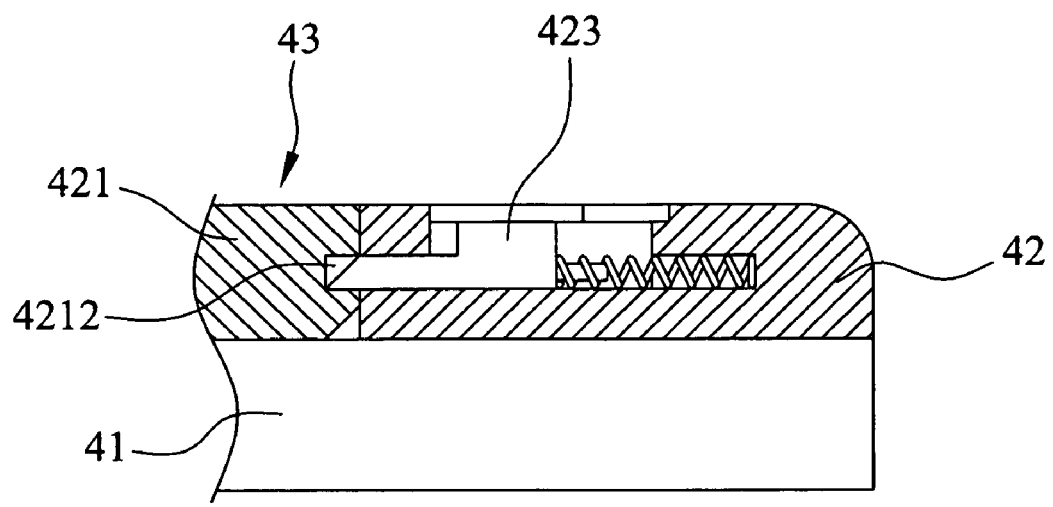
FIG. 4 shows the second way of combining the rotatable plate 421 with the first display device 42.

FIG. 4 shows the second way of combining the rotatable plate 421 with the first display device 42. The rotatable plate 421 is connected to the first display device 42 through a recovering spring 44, and is kept in an open state by the elasticity of the recovering spring 44. Two trenches 4212 are respectively arranged on left and right sides of the rotatable plate 421, and the first display device 42 has a limiting part 423 corresponding to the trench 4212.

Figure 5A:
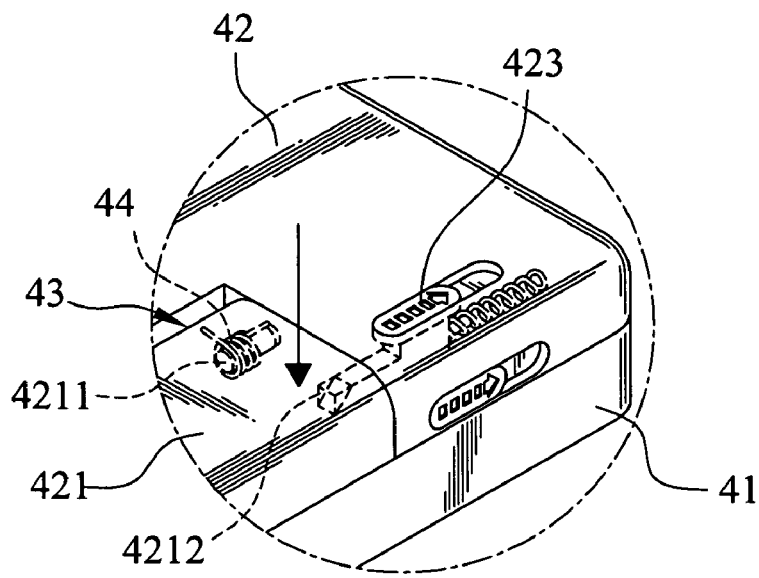
FIG. 5A shows a perspective view of the closed rotatable plate 421.
Figure 5B:
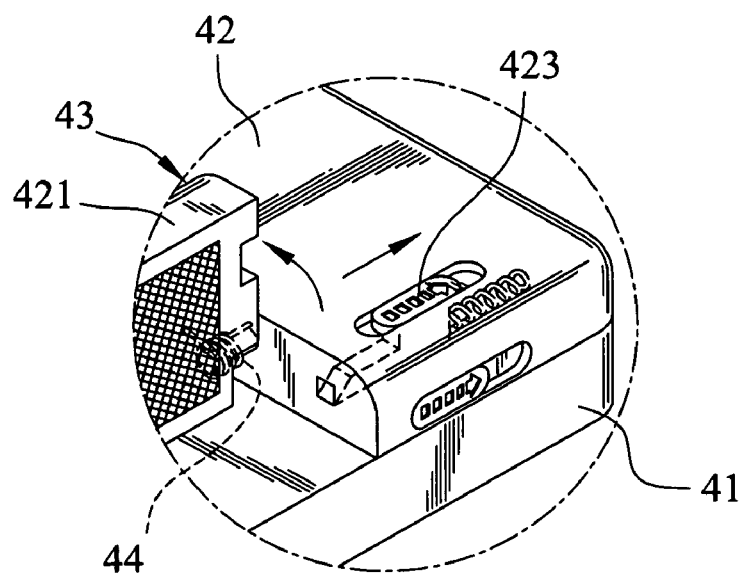
FIG. 5B shows a perspective view of the open rotatable plate 421.

FIG. 5A shows a perspective view of the closed rotatable plate 421 and FIG. 5B shows a perspective view of the open rotatable plate 421. Users close the multimedia-processing device 43 by exerting a down force to the rotatable plate 421 and by inserting the limiting part 423 into the trench 4212. And users open the multimedia-processing device 43 by moving the limiting part 423 to disengage from the trench 4212 and by the elasticity of the recovering spring 44, to open the rotatable plate 421.

Figure 6:
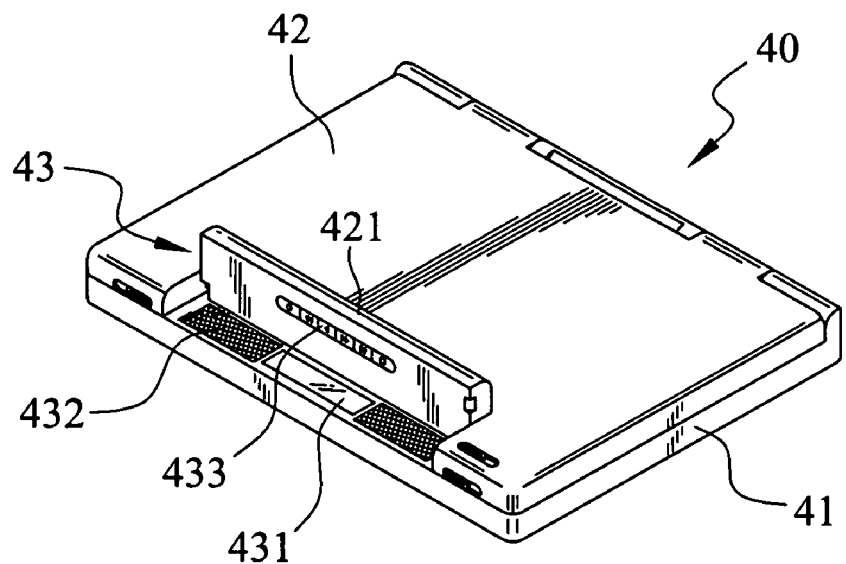
FIG. 6 illustrates a perspective view of a portable computer for playing with multimedia devices directly as a second embodiment of the present invention.

FIG. 6 illustrates a perspective view of a portable computer for playing multimedia data directly as a second embodiment of the present invention. The second embodiment is roughly similar to the first embodiment except the control keys 433 disposed on the rotatable plate 421 and the second display device 431 and the audio output 432 disposed on the mainframe 41. Therefore, the difference between two embodiments is the disposition of the second display device 431, the audio output 432, and the control keys 433.

Figure 7:
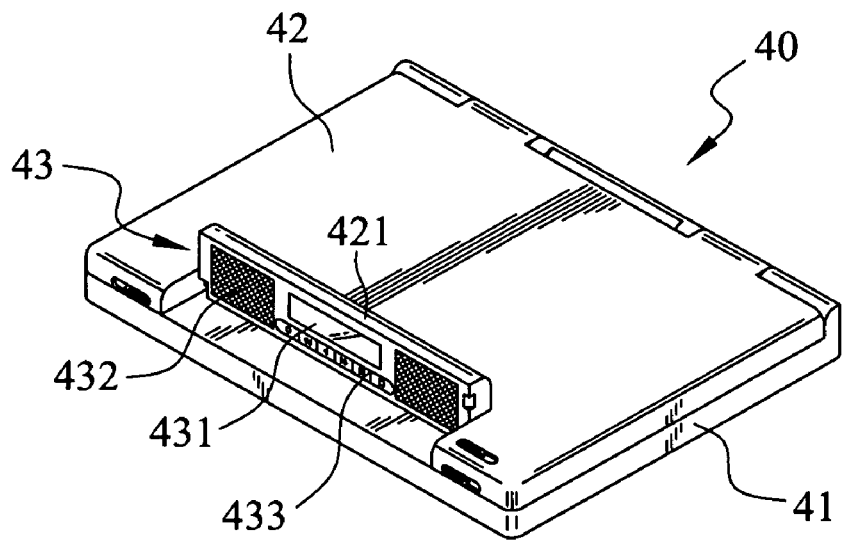
FIG. 7 illustrates a perspective view of a portable computer for playing with multimedia devices directly as a third embodiment of the present invention.

FIG. 7 illustrates a perspective view of a portable computer for playing multimedia data directly as a third embodiment of the present invention. The third embodiment is roughly similar to the first embodiment except the control keys 433, the second display device 431, and the audio output 432, totally disposed on the rotatable plate 421, and therefore users can execute the multimedia-processing device 43 simply by opening the rotatable plate 421.

Figure 8:
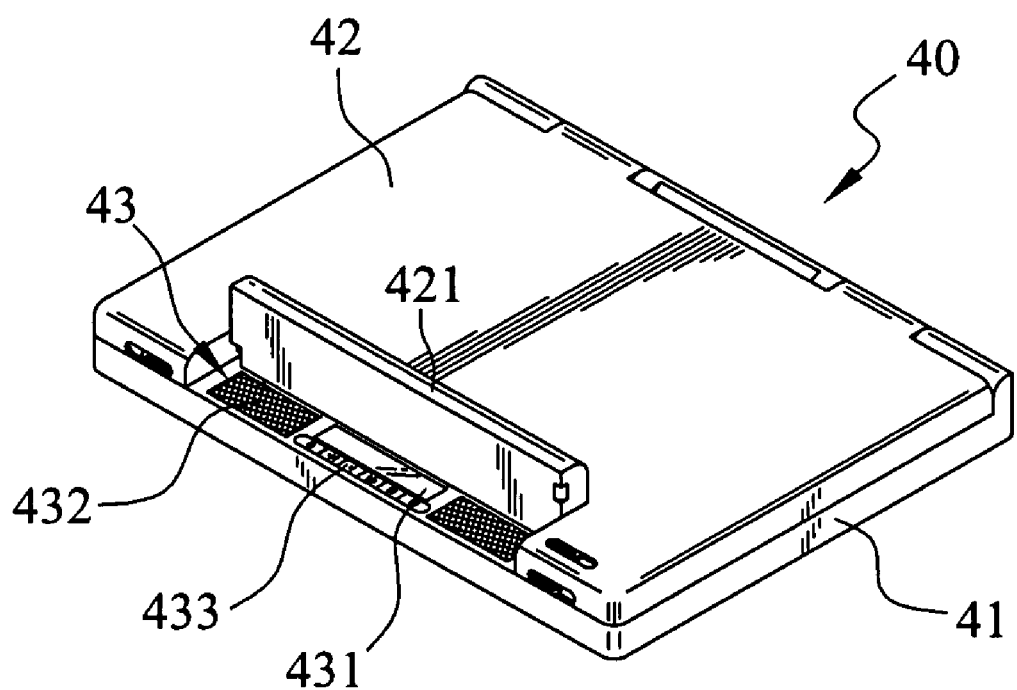
FIG. 8 illustrates a perspective view of a portable computer for playing with multimedia devices directly as a fourth embodiment of the present invention.

FIG. 8 illustrates a perspective view of a portable computer for playing multimedia data directly as a fourth embodiment of the present invention. The fourth embodiment is roughly similar to the first embodiment except the control keys 433, the second display device 431, and the audio output 432, totally disposed on the mainframe 41, and therefore users can execute the multimedia-processing device 43 simply by opening the rotatable plate 421.

Knowing the invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A portable computer system with a rotatable plate for playing multimedia data directly, comprising:
   a mainframe for processing electrical data;
   a first display device rotatably assembled at one side of the mainframe for displaying the processing result of the electrical data;
   a rotatable plate rotatably assembled at one side of the first display device; and
   a multimedia-processing device arranged on the rotatable plate and on the mainframe corresponding to the rotatable plate for playing multimedia data, when users using the multimedia-processing device without turning on the mainframe, the rotatable plate rotating relative to the first display device to expose the multimedia-processing device for operation.

2. The portable computer system according to claim 1, wherein the rotatable plate further includes a trench at one side and the first display device further includes a limiting part corresponding to the trench, the rotatable plate is connected to the first display device through a recovering spring and keeps in an open state by the elasticity of the recovering spring, the multimedia-processing device is closed by moving the limiting part inserted into the trench, and the multimedia-processing device is opened by moving the limiting part to disengage from the trench and by the elasticity of the recovering spring to open the rotatable plate.

3. The portable computer system according to claim 1, wherein the multimedia-processing device includes a second display device arranged on the rotatable plate for displaying information about playing the multimedia data, an audio output disposed on the rotatable plate for outputting the audio signals, and a plurality of control keys disposed on the mainframe corresponding to the rotatable plate for executing different functions.

4. The portable computer system according to claim 1, wherein the multimedia-processing device includes a second display device arranged on the mainframe corresponding to the rotatable plate for displaying information about playing the multimedia data, an audio output disposed on the mainframe corresponding to the rotatable plate for outputting the audio signals, and a plurality of control keys disposed on the rotatable plate for executing different functions.

5. The portable computer system according to claim 1, wherein the multimedia-processing device includes a second display device arranged on the mainframe corresponding to the rotatable plate for displaying information about playing the multimedia data, an audio output disposed on the mainframe corresponding to the rotatable plate for outputting the audio signals, and a plurality of control keys disposed on the mainframe corresponding to the rotatable plate for executing different functions.

6. The portable computer system according to claim 1, wherein the multimedia-processing device includes a second display device arranged on the rotatable plate for displaying information about playing the multimedia data, an audio output disposed on the rotatable plate for outputting the audio signals, and a plurality of control keys disposed on the rotatable plate for executing different functions.

* * * * *